US008690117B2

(12) United States Patent
Dunn et al.

(10) Patent No.: US 8,690,117 B2
(45) Date of Patent: *Apr. 8, 2014

(54) WATER METER

(75) Inventors: David James Carlos Dunn, Ontario (CA); Kevin Peter Kowalchuk, Ontario (CA); Stephen Williams Smith, Raleigh, NC (US); Jack Ryan Williamson, Lewisville, TX (US); James Scott Williamson, Denton, TX (US); Walter Scott Williamson, Lewisville, TX (US)

(73) Assignee: Capstone Metering LLC, Carrollton, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/359,920

(22) Filed: Jan. 27, 2012

(65) Prior Publication Data

US 2012/0210708 A1 Aug. 23, 2012

Related U.S. Application Data

(63) Continuation-in-part of application No. 12/299,493, filed as application No. PCT/US2007/068242 on May 4, 2007, application No. 13/359,920, which is a continuation-in-part of application No. PCT/US2009/052426, filed on Jul. 31, 2009.

(60) Provisional application No. 60/797,540, filed on May 4, 2006.

(51) Int. Cl.
*G01L 13/00* (2006.01)

(52) U.S. Cl.
USPC ............... 251/129.01; 251/129.11; 290/54; 73/861.79; 702/46; 702/47

(58) Field of Classification Search
USPC ............. 251/129.01, 129.04, 129.11; 290/43, 290/54; 73/861.77–861.84, 861.87–861.94; 702/46, 47
See application file for complete search history.

(56) References Cited

U.S. PATENT DOCUMENTS

| | | | |
|---|---|---|---|
| D51,156 S | 8/1917 | Towle | |
| D183,015 S | 6/1958 | Newbury et al. | |
| 3,550,426 A * | 12/1970 | Griffo | 73/861.77 |
| 3,636,767 A * | 1/1972 | Duffy | 73/861.77 |
| 3,822,591 A * | 7/1974 | Li | 73/861.81 |
| 3,894,433 A | 7/1975 | Riester et al. | |
| 4,237,454 A | 12/1980 | Meyer | |
| 4,474,049 A | 10/1984 | Hansen et al. | |
| 4,523,480 A | 6/1985 | Inoue | |
| 4,838,310 A * | 6/1989 | Scott et al. | 251/129.04 |
| 4,951,915 A * | 8/1990 | Piao | 251/129.04 |

(Continued)

FOREIGN PATENT DOCUMENTS

| | | |
|---|---|---|
| EP | 1858144 A2 | 11/2007 |
| WO | WO-0107783 A1 | 2/2001 |
| WO | WO 2005103540 A1 * | 11/2005 |

*Primary Examiner* — Eric Keasel
(74) *Attorney, Agent, or Firm* — Winstead PC

(57) ABSTRACT

A meter includes an inlet for receiving a fluid and a housing defining a cylindrical chamber receiving the fluid from the inlet, wherein a chamber axis passes through a center of the cylindrical chamber. The meter also includes an outlet coupled to the housing, wherein the outlet is axially aligned with the inlet along a flow axis, and the flow axis does not intersect the chamber axis.

18 Claims, 14 Drawing Sheets

(56) References Cited

U.S. PATENT DOCUMENTS

| | | | |
|---|---|---|---|
| 5,056,107 A | 10/1991 | Johnson et al. | |
| 5,079,495 A * | 1/1992 | Yasuo | 320/101 |
| 5,199,307 A | 4/1993 | Onoda et al. | |
| 5,251,815 A * | 10/1993 | Foye | 236/49.3 |
| D348,018 S | 6/1994 | Poleshuk et al. | |
| D349,252 S | 8/1994 | Hurd | |
| D349,661 S | 8/1994 | DeJarlais et al. | |
| D358,782 S | 5/1995 | Louwagie et al. | |
| 5,434,911 A | 7/1995 | Gray et al. | |
| 5,438,329 A | 8/1995 | Gastouniotis et al. | |
| 5,451,938 A | 9/1995 | Brennan, Jr. | |
| 5,481,259 A | 1/1996 | Bane | |
| 5,493,287 A | 2/1996 | Bane | |
| 5,548,990 A | 8/1996 | Northedge | |
| 5,553,094 A | 9/1996 | Johnson et al. | |
| 5,594,740 A | 1/1997 | LaDue | |
| 5,655,568 A | 8/1997 | Bhargava et al. | |
| 5,659,300 A | 8/1997 | Dresselhuys et al. | |
| D384,300 S | 9/1997 | Hendy | |
| 5,714,931 A | 2/1998 | Petite et al. | |
| 5,748,104 A | 5/1998 | Argyroudis et al. | |
| 5,751,797 A | 5/1998 | Saadeh | |
| 5,801,643 A | 9/1998 | Williams et al. | |
| 5,815,086 A | 9/1998 | Ivie et al. | |
| 5,907,491 A | 5/1999 | Canada et al. | |
| 5,926,103 A | 7/1999 | Petite | |
| 5,926,531 A | 7/1999 | Petite | |
| 5,963,146 A | 10/1999 | Johnson et al. | |
| 6,028,522 A | 2/2000 | Petite | |
| 6,036,333 A * | 3/2000 | Spiller | 362/192 |
| 6,044,062 A | 3/2000 | Brownrigg et al. | |
| 6,058,374 A | 5/2000 | Guthrie et al. | |
| 6,060,994 A | 5/2000 | Chen | |
| 6,163,276 A | 12/2000 | Irving et al. | |
| 6,172,616 B1 | 1/2001 | Johnson et al. | |
| 6,195,018 B1 | 2/2001 | Ragle et al. | |
| 6,218,953 B1 | 4/2001 | Petite | |
| 6,233,327 B1 | 5/2001 | Petite | |
| 6,246,677 B1 | 6/2001 | Nap et al. | |
| 6,249,516 B1 | 6/2001 | Brownrigg et al. | |
| 6,288,641 B1 | 9/2001 | Casais | |
| 6,333,975 B1 | 12/2001 | Brunn et al. | |
| 6,373,399 B1 | 4/2002 | Johnson et al. | |
| 6,424,270 B1 | 7/2002 | Ali | |
| 6,430,268 B1 | 8/2002 | Petite | |
| 6,437,692 B1 | 8/2002 | Petite et al. | |
| 6,493,377 B2 | 12/2002 | Schilling et al. | |
| 6,512,463 B1 | 1/2003 | Campbell et al. | |
| D469,707 S | 2/2003 | Schwartz et al. | |
| D472,835 S | 4/2003 | Hendey | |
| 6,560,543 B2 | 5/2003 | Wolfe et al. | |
| 6,618,578 B1 | 9/2003 | Petite | |
| 6,624,750 B1 | 9/2003 | Marman et al. | |
| 6,626,048 B1 | 9/2003 | Dam Es et al. | |
| 6,628,764 B1 | 9/2003 | Petite | |
| 6,633,781 B1 | 10/2003 | Lee et al. | |
| 6,650,543 B2 | 11/2003 | Lai et al. | |
| 6,653,945 B2 | 11/2003 | Johnson et al. | |
| 6,657,552 B2 | 12/2003 | Belski et al. | |
| 6,677,861 B1 | 1/2004 | Henry et al. | |
| D486,409 S | 2/2004 | Grant | |
| 6,747,557 B1 | 6/2004 | Petite et al. | |
| 6,778,099 B1 | 8/2004 | Meyer et al. | |
| 6,789,419 B2 | 9/2004 | Hennebelle | |
| 6,836,737 B2 | 12/2004 | Petite et al. | |
| 6,891,838 B1 | 5/2005 | Petite et al. | |
| 6,898,987 B1 | 5/2005 | Hayman | |
| 6,914,533 B2 | 7/2005 | Petite | |
| 6,914,893 B2 | 7/2005 | Petite | |
| 6,931,445 B2 | 8/2005 | Davis | |
| 6,931,946 B1 | 8/2005 | Hendey | |
| 6,947,854 B2 | 9/2005 | Swarztrauber et al. | |
| 6,954,701 B2 | 10/2005 | Wolfe | |
| 6,980,079 B1 | 12/2005 | Shintani et al. | |
| 6,994,309 B2 * | 2/2006 | Fernandez-Sein | 251/129.04 |
| 7,009,530 B2 | 3/2006 | Zigdon et al. | |
| 7,012,546 B1 | 3/2006 | Zigdon et al. | |
| 7,053,767 B2 | 5/2006 | Petite et al. | |
| 7,054,271 B2 | 5/2006 | Brownrigg et al. | |
| 7,072,945 B1 | 7/2006 | Nieminen et al. | |
| 7,079,810 B2 | 7/2006 | Petite et al. | |
| 7,088,239 B2 | 8/2006 | Basinger et al. | |
| 7,089,125 B2 | 8/2006 | Sonderegger | |
| 7,103,511 B2 | 9/2006 | Petite | |
| 7,117,051 B2 | 10/2006 | Landry et al. | |
| 7,124,184 B2 | 10/2006 | Chung et al. | |
| 7,137,550 B1 | 11/2006 | Petite | |
| 7,142,107 B2 | 11/2006 | Kates | |
| 7,256,704 B2 | 8/2007 | Yoon et al. | |
| 7,263,073 B2 | 8/2007 | Petite et al. | |
| 7,295,128 B2 | 11/2007 | Petite | |
| 7,301,456 B2 | 11/2007 | Han | |
| 7,308,904 B2 * | 12/2007 | Bria et al. | 137/311 |
| D559,717 S | 1/2008 | Hendey | |
| D560,132 S | 1/2008 | Hendey | |
| 7,353,280 B2 | 4/2008 | Chiles et al. | |
| 7,356,614 B2 | 4/2008 | Kim et al. | |
| 7,363,031 B1 | 4/2008 | Aisa | |
| 7,397,907 B2 | 7/2008 | Petite | |
| 7,417,557 B2 | 8/2008 | Osterloh et al. | |
| 7,424,527 B2 | 9/2008 | Petite | |
| 7,443,313 B2 | 10/2008 | Davis et al. | |
| 7,444,401 B1 | 10/2008 | Keyghobad et al. | |
| 7,453,373 B2 | 11/2008 | Cumeralto et al. | |
| D582,814 S | 12/2008 | Ball et al. | |
| D583,692 S | 12/2008 | Ball et al. | |
| 7,468,661 B2 | 12/2008 | Petite et al. | |
| 7,480,501 B2 | 1/2009 | Petite | |
| 7,526,539 B1 | 4/2009 | Hsu | |
| 7,650,425 B2 | 1/2010 | Davis et al. | |
| 7,697,492 B2 | 4/2010 | Petite | |
| 7,739,378 B2 | 6/2010 | Petite | |
| 7,752,309 B2 | 7/2010 | Keyghobad et al. | |
| 7,756,086 B2 | 7/2010 | Petite et al. | |
| 7,783,738 B2 | 8/2010 | Keyghobad et al. | |
| 7,789,370 B2 * | 9/2010 | Eriksson | 251/129.11 |
| 7,792,946 B2 | 9/2010 | Keyghobad et al. | |
| 7,880,641 B2 | 2/2011 | Parris et al. | |
| D645,770 S | 9/2011 | Margalit et al. | |
| 2001/0048030 A1 | 12/2001 | Sharood et al. | |
| 2002/0013679 A1 | 1/2002 | Petite | |
| 2002/0031101 A1 | 3/2002 | Petite et al. | |
| 2002/0062392 A1 | 5/2002 | Nishikawa et al. | |
| 2002/0067717 A1 | 6/2002 | Raschke et al. | |
| 2002/0073183 A1 | 6/2002 | Yoon et al. | |
| 2002/0083778 A1 | 7/2002 | Hamilton | |
| 2002/0190956 A1 | 12/2002 | Klein et al. | |
| 2003/0009515 A1 | 1/2003 | Lee et al. | |
| 2003/0018733 A1 | 1/2003 | Yoon et al. | |
| 2003/0018776 A1 | 1/2003 | Yoon et al. | |
| 2003/0036810 A1 | 2/2003 | Petite | |
| 2003/0046377 A1 | 3/2003 | Daum et al. | |
| 2003/0074109 A1 | 4/2003 | Jeong et al. | |
| 2004/0010561 A1 | 1/2004 | Kim et al. | |
| 2004/0054747 A1 | 3/2004 | Breh et al. | |
| 2004/0139210 A1 | 7/2004 | Lee et al. | |
| 2004/0158333 A1 | 8/2004 | Ha et al. | |
| 2004/0183687 A1 | 9/2004 | Petite et al. | |
| 2004/0261523 A1 | 12/2004 | Cognot | |
| 2005/0096753 A1 | 5/2005 | Arling et al. | |
| 2005/0159823 A1 | 7/2005 | Hayes et al. | |
| 2005/0195768 A1 | 9/2005 | Petite et al. | |
| 2005/0195775 A1 | 9/2005 | Petite et al. | |
| 2005/0201397 A1 | 9/2005 | Petite | |
| 2005/0203647 A1 | 9/2005 | Landry et al. | |
| 2006/0041655 A1 | 2/2006 | Holloway et al. | |
| 2006/0098576 A1 | 5/2006 | Brownrigg et al. | |
| 2008/0186898 A1 | 8/2008 | Petite | |
| 2009/0068947 A1 | 3/2009 | Petite | |
| 2009/0215424 A1 | 8/2009 | Petite | |
| 2009/0243840 A1 | 10/2009 | Petite et al. | |
| 2010/0017465 A1 | 1/2010 | Brownrigg et al. | |

(56) References Cited

U.S. PATENT DOCUMENTS

2010/0039984 A1 2/2010 Brownrigg
2010/0194582 A1 8/2010 Petite
2010/0250054 A1 9/2010 Petite
2010/0265909 A1 10/2010 Petite et al.
2010/0312881 A1 12/2010 Davis et al.

* cited by examiner

WATER METER

RELATED APPLICATIONS

This application is a continuation-in-part of U.S. patent application Ser. No. 12/299,493 filed Mar. 24, 2009, which is a U.S. National Stage Entry of PCT/US07/68242 filed May 4, 2007 claiming priority to U.S. Provisional Patent Application 60/797,540 filed May 4, 2006. This application is also a continuation-in-part of PCT/US09/52426 filed Jul. 31, 2009.

The entirety of the each of the above-referenced applications are incorporated into this application by reference.

TECHNICAL FIELD

The present invention relates in general to meters, and more specifically, to fluid meters with an offset chamber.

BACKGROUND

Fluid meters are utilized to measure volume of fluid usage. For example, in some countries, water meters are used at each residential and commercial building in a public water supply system. To the extent that conventional utility meters can transmit usage data, these meters are typically capable of transmitting data only relatively infrequently due to power issues and other constraints. For example, this transmission distance is generally limited, requiring field technicians to either read the meter directly or from a relatively short distance away.

After 3-5 years of operation, wear and tear may require meters to be recalibrated. Worn meters may over or under read the amount of fluid passing through the meter and it may require significant effort and expense to systematically check and calibrate individual meters in a given service area.

In some cases, space constraints may make it difficult or impossible to add additional components to a meter. For example, it may be desirable to incorporate a control valve into a meter, but the space constraints of American Water Works Association (AWWA) Standard(s) or other standards or requirements may make it difficult to incorporate the control valve.

SUMMARY

Accordingly, a meter includes an inlet for receiving a fluid and a housing defining a cylindrical chamber receiving the fluid from the inlet, wherein a chamber axis passes through a center of the cylindrical chamber. The meter also includes an outlet coupled to the housing, wherein the outlet is axially aligned with the inlet along a flow axis, and the flow axis does not intersect the chamber axis.

Another embodiment provides a meter including an inlet and a housing defining a first chamber, wherein the housing is coupled to the inlet. The meter also includes an impeller housed within the first chamber, wherein the impeller rotates around a chamber axis passing through a center of the first chamber; and an outlet coupled to the housing, wherein a flow axis passes through the inlet and the outlet, and the chamber axis is offset by a selected distance from the flow axis.

Yet another embodiment provides a fluid metering system including an inlet and a first housing defining a first chamber, wherein the first housing is coupled to the inlet; a first turbine housed within the first chamber, wherein the first turbine rotates around a first chamber axis. The metering system also includes a second housing defining a second chamber, wherein the second housing is coupled to the first housing; a second turbine housed within the second chamber, wherein the second turbine rotates around a second chamber axis; and an outlet axially aligned with the inlet along a flow axis, wherein the first chamber axis is offset by a first selected distance from the flow axis and the second chamber axis is offset by a second selected distance from the flow axis.

The foregoing has outlined some of the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein.

DETAILED DESCRIPTION

Figure 1:
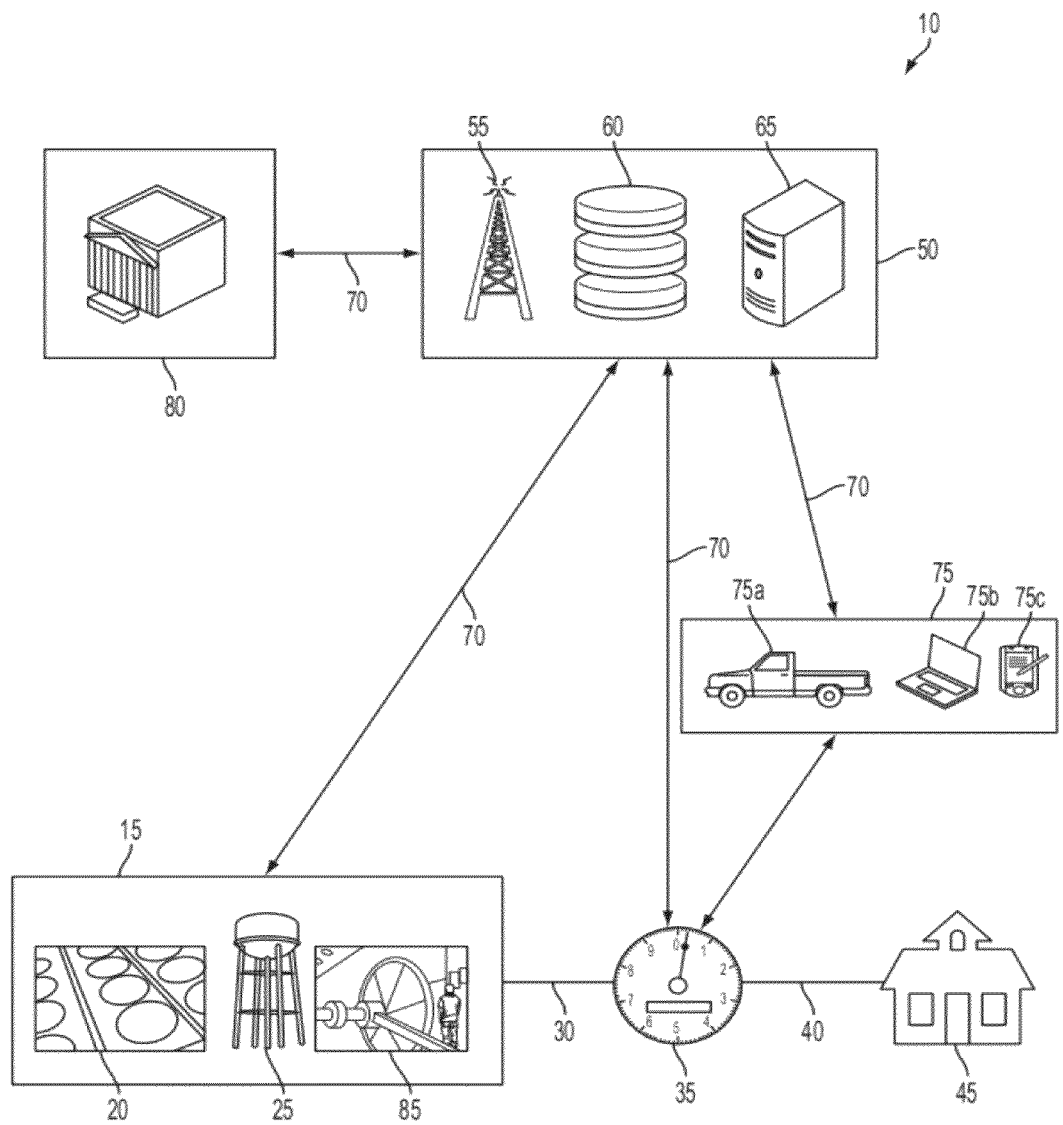
FIG. 1 is an illustration of a system for fluid distribution management.

Refer now to the drawings wherein depicted elements are not necessarily shown to scale and wherein like or similar elements are designated by the same reference numeral through the several views.

FIG. 1 is an illustration of a system for water distribution management, indicated generally at 10. System 10 includes fluid utility grid 15 for the distribution of fluid to clients 45, e.g., households and businesses within a service area. Water utility grid 15 may include water treatment plants 20, water storage 25, pumping station 85 and other facilities suitable for receiving, treating, storing and distributing water throughout the service area. Water utility grid 15 distributes water to client 45 via utility line 30 and client line 40.

System 10 includes a fluid meter, such as water meter 35. Water meter 35 comprises a valve (not shown in FIG. 1) or similar device to regulate water flow to client 45 from utility line 30. Water meter 35 is operable to determine the water usage of client 45 and control valve functions to shut water off or turn water on for client 45. System 10 includes wireless network 70. Water meter 35 may send and receive data via wireless network 70. Wireless network 70 may be any public, private or proprietary network, for instance. Wireless network 70 may include, for example, cellular, Wi-Fi, Wi-Max, 400 MHz, 900 MHz, proprietary radio network protocols, or any other type of wireless communications protocol.

System 10 includes network operations center 50 to manage and monitor the distribution of water utilities in system 10. Network operations center 50 may be operated by a water utility company, for example. Network operations center 50 includes a wireless communications transmitter/receiver 55 to send and receive data over wireless network 70. Network operations center 50 includes one or more servers 60 to manage data transmission through system 10. For example, transmitter/receiver 55 may receive radio frequency (RF) signals via wireless network 70 and convert these signals to Internet Protocol (IP) signals, or other suitable network protocol, for transmission to server 60, or other components of system 10. Network operations center 50 may also include database 65 to store data concerning client fluid usage and service area fluid usage, among other information.

Network operations center 50 may receive data from water meter 35 concerning the fluid usage of client 45. For example, operation center 50 may receive usage alarms, notices, and the like. Moreover, network operations center 50 may send data or instructions to water meter 35. System 10 may include one or more mobile field technicians 75 to facilitate data collection and transmission throughout the service area associated with system 10. For example, network operations center 50 may send data to and receive data from water meter 35 via mobile field technician 75. Mobile field technicians 75 may include transmitter/receivers 75a, portable computers 75b, and cell phones or personal digital assistants (PDA) 75c, for example, to communicate with water meter 35 and wireless network 70.

System 10 may also allow communication with client 45 concerning the status or usage of the water utility. For example, network operations center 50 may transmit e-mail correspondence to client 45 regarding alerts or notices. For example, if network operations center 50 receives data indicating a potential water leak, network operations center 50 may request that client 45 verify whether a water leak has been observed. If the service area is subject to water rationing or similar form of controlled distribution, for instance, network operations center 50 may provide a notice to client 45 concerning the remaining amount of water client 45 is allowed to use for a given rationing period.

System 10 may include one or more emergency response centers 80. Emergency response center 80 may be any city, state or federal government agency responsible for responding to emergencies and with authority to redirect or shut off utilities based on the circumstances, e.g., natural disasters or contamination, for example. For example, emergency response center 80 may include local fire departments, the Federal Emergency Management Agency (FEMA), the United States Department of Homeland Security (DHS), or similar entities. Network operations center 50 may communicate with emergency response center 80, via wireless network 70, for example, and manage the distribution of utilities throughout system 10 in accordance with instructions received from emergency response center 80.

Figure 2:
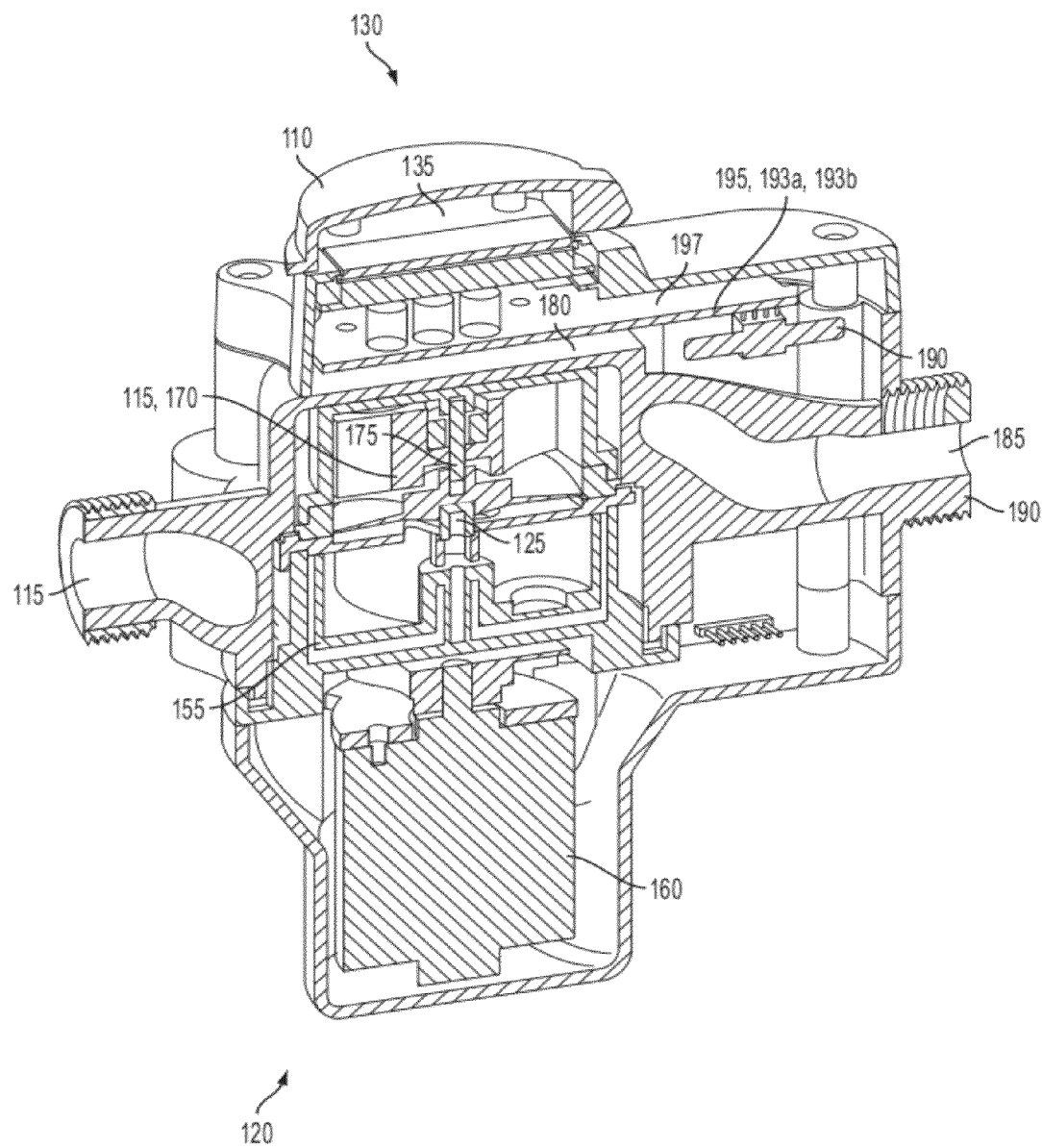
FIG. 2 is an illustration of fluid meter providing self-calibration and power generation.

FIG. 2 is an illustration of fluid or water meter 35 providing self-calibration and power generation. Meter 35 may include inlet 115, power system 120, diverter plate 125, metering system 130, display 135, and outlet 140. Fluid, such as water, enters meter 35 through inlet 115 and flows into lower chamber 150. While embodiments discussed herein may specifically refer to water when discussing meter 35, it should be noted that any suitable fluid may be utilized with meter 35.

Figure 3:
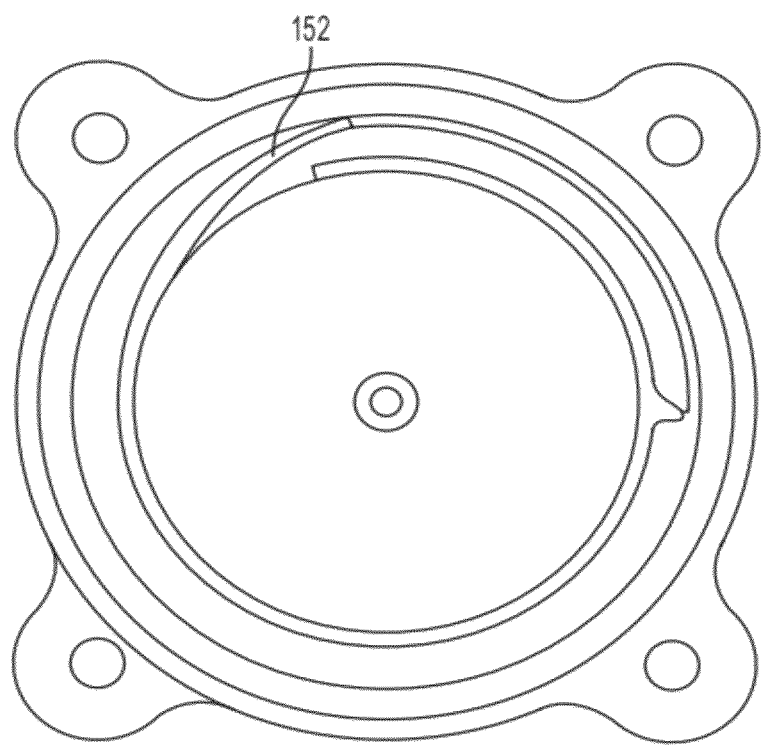
FIG. 3 is an illustration of a lower chamber of a fluid meter.

Power system 120 includes lower chamber 150, turbine or impeller 155, generator or alternator 160, and battery system (not shown). Any reference to a battery system also refers to a power storage device. Power system 120 is utilized to generate and store power for meter 35. Fluid entering lower chamber 150 causes turbine 155 to rotate. Turbine 155 may utilize straight blades or curved blades. In some embodiments, lower chamber 150 may include a jet 152 to help power turbine 155 as shown in FIG. 3. As fluid enters lower chamber 150 through jet 152, it transfers mechanical energy to turbine 155 and moves towards the center of lower chamber 150. Generator 160 is coupled to turbine 155 and converts the mechanical energy of the fluid flow into electrical energy. For example, generator 160 may be an electric power generator, a Tesla turbine, or the like. Electrical energy harnessed by generator 160 may be utilized to provide charge current to a battery system and/or to power to components of meter 35. In some embodiments, a magnetic coupler may be utilized to magnetically couple turbine 155 and generator 160. In one embodiment, generator 160 may be capable of generating power at low RPM, such as about 100 RPM. For example, the design of various components of meter 35 may allow charging at low RPM, such as the design and shape of inlet 115, jet 152, turbine 155, diverter plate 125, and the like. Further, electrical components (e.g. generator 160, battery, charging circuit, and other power components) may be capable of generating sufficient power for charging at low RPMs.

Metering system 130 includes upper chamber 165, turbine or impeller 170, rotating magnet 175, magnet switch 180, a flow restrictor 185, pressure differential sensor 190, and outlet 140. Upper chamber 165 is separated from lower chamber 150 by one or more diverter plates 125. Plate(s) 125 act as a baffle to fluid traveling from lower chamber 150 to upper chamber 165 and may thereby reduce turbulence. Because turbulence causes inconsistent flow or fluctuations in the flowrate, plate(s) 125 may increase the accuracy of the metering system 130 by reducing turbulence. One or more plates 125 may include directional fins that are utilized to establish a consistent rotational flow that drives impeller 170. As fluid flows through upper chamber 165, the flow causes impeller 170 to rotate. As with turbine 155, impeller 170 may utilize straight or curved blades.

Fluid flowing from lower chamber 150 into upper chamber 165 may cause impeller 170 to rotate. As impeller 170 rotates, rotating magnet 175 causes magnetic switch 180 actuate. Each actuation of magnetic switch 180 creates a pulse that indicates a precise amount of fluid metered through metering system 130. For example, the blades of impeller 170 may force out a precise amount of fluid during each rotation. In other embodiments, rotating magnet 175 and switch 180 may be substituted with an alternative system for detecting the number of rotations of impeller 170, such as an inductive pickup, Hall effect sensor, optical sensor, or any other suitable sensor(s).

As fluid flows out of upper chamber 165 towards outlet 140, it passes through flow restrictor 185, such as a Venturi tube or an orifice plate. Flow restrictor 185 includes pressure differential sensor 190 that provides a precision voltage output, representing the pressure difference detected, when fluid passes by sensor 190 that is utilized to calculate the amount of fluid metered through metering system 130.

Water meter 35 may also include primary wireless communications module 193a, which may be communicatively coupled to water meter 35 via an expansion card slot 195. Primary wireless communications module 193a may comprise any module operable to support two-way communication over a wireless network. For example, primary wireless communications module 193a may include a plug-in radio communications card to support cellular, Wi-Fi, Wi-Max, 400 MHz, 900 MHz or proprietary radio network protocols, among other wireless protocols. Water meter 35 may also include backup wireless communications module 193b in the event that primary wireless communications module 193a becomes inoperable or the communications network for primary wireless communications module 193a goes down. Backup wireless communications module 193b preferably uses a different communications protocol than module 193a, e.g., communicates via a different network, to provide greater reliability or emergency response. Water meter 35 may include additional expansion card slots 195 to allow for additional wireless communications modules. Water meter 35 may include an antenna 197, e.g., coupled to communications modules 193a and 193b, for example, to facilitate wireless communication.

Figure 4:
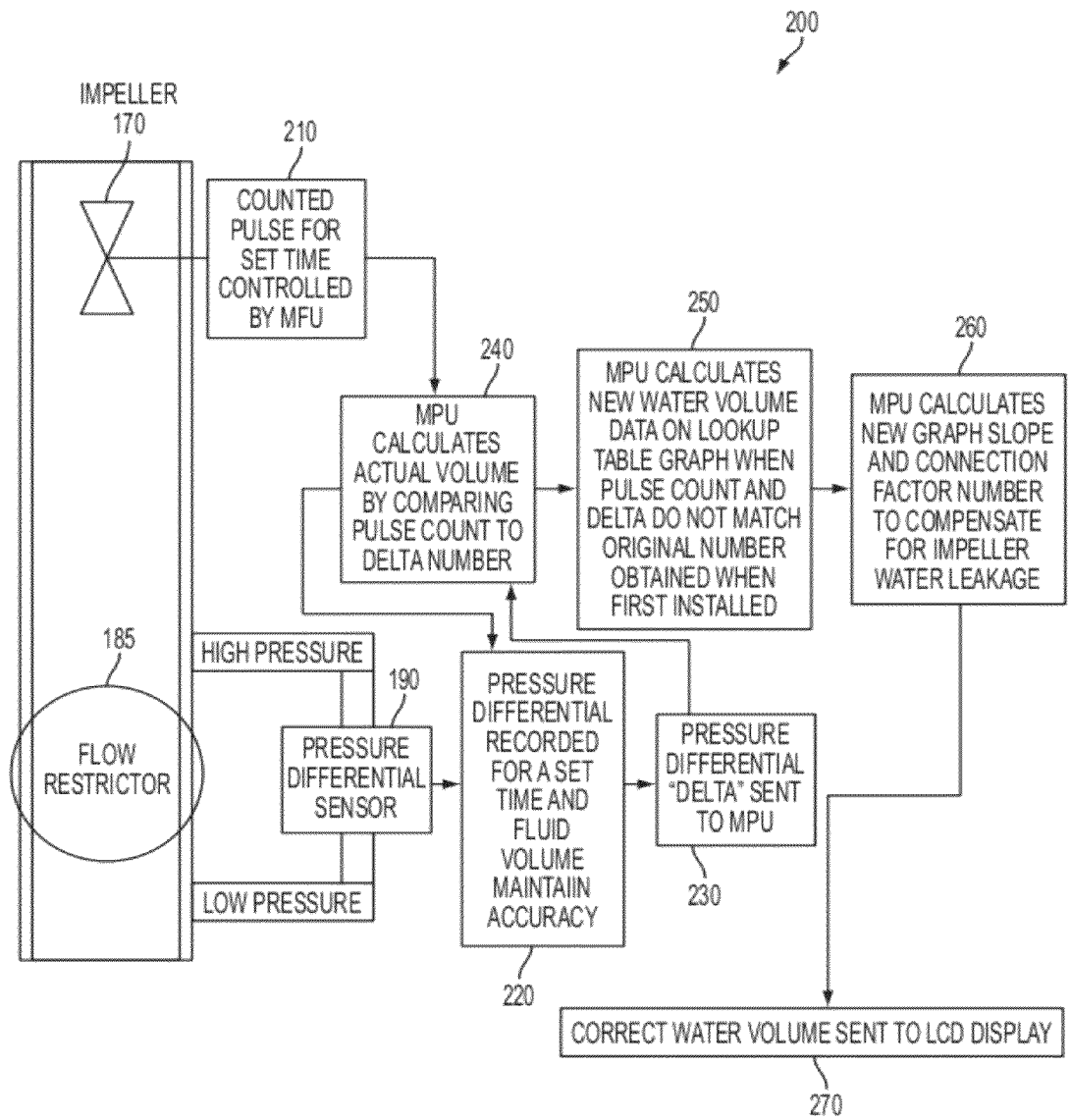
FIG. 4 is an illustration of a self-calibration process.

FIG. 4 is an illustration of a self-calibration process 200. As discussed previously, as fluid flows through fluid meter 35, pulses from impeller 170 are detected and a pressure drop through flow restrictor 185 is detected. The number of pulses detected in a set time period is counted by a processor in step 210. The number of pulses counted is utilized to calculate the flowrate of an amount or volume of fluid, such as gallons per minute, passing through meter 35. In some embodiments, the processor may utilize a lookup table that provides flowrate associated with the number of pulses detected to calculate the volume of fluid passing through meter 35. The flowrate calculated utilizing the number of pulses is herein referred to as the pulse flowrate or pulse GPM (Gallons Per Minute).

Pressure differential sensor 190 produces a voltage output in accordance with a pressure drop measured through flow restrictor 185, e.g. Venturi tube. Accurate measurement of the flow from Venturi tube 185 can be determined by measuring the pressure difference p1−p2. A formula derived from the Bernoulli's Principle $Q=c_d A_2 [2(p_1-p_2)/\rho(1-(A_2/A_1)^2)]^{1/2}$ can be used to determine the flowrate through Venturi tube 185. In the formula, Q represents the flowrate, $c_d$ represents the discharge coefficient, $A_1$ and $A_2$ represent flow area, $p_1$ and $p_2$ represent pressure, and $\rho$ represents density. The voltage output from sensor 190 may be recorded for the set time period in step 220 and provided to a processor in step 230. In some embodiments, the processor may utilize a lookup table that provides flowrate associated with the voltage output detected from sensor 190 to calculate the volume of fluid passing through meter 35. The flowrate determined based on the voltage output from sensor 190 is herein referred to as dif-flowrate or dif-GPM. In some embodiment, meter 35 may provide a minimum length of five times the larger diameter of Venturi tube 185 in front of a pressure measurement point to avoid turbulent flow near sensor 190.

The processor compares the values of the pulse GPM and the dif-GPM to determine if meter 35 is accurately metering in step 240, e.g. the difference between the values falls within an acceptable variance range. In some embodiment, a difference of 1% in the flowrates is acceptable. Dif-GPM and pulse-GPM may not match for various reasons. For example, impeller 170 may be either worn and fluid is leaking past it or there may be some sort of mechanical malfunction preventing impeller 170 from rotating fully with the presented fluid flow. This may cause some meters to indicate that less fluid has passed through the meter than the actual volume of fluid that has passed through the meter. However, the self calibration feature of meter 35 is capable of detecting the inconsistent readings and providing a correction factor utilized to calculate a corrected volume that reflect the actual amount of fluid being used. In some embodiments, correction factors based on historical testing data may be provided in a correction factor table. The processor calculates a corrected fluid volume utilizing the correction factor table when pulse-GPM and dif-GPM do not substantially match in step 250. For example, the pulse-GPM is multiplied by the correction factor and time to determine a corrected volume. The processor also calculates a new graph slope and correction factor number to compensate in step 260. For example, a lookup table (e.g. pulse table or pressure differential table), for converting the number of pulses detected and/or the pressure differential measured into the amount of fluid metered, may be adjusted to provided corrected values. If the pulse GPM and the dif-GPM do not match within a desired accuracy, a corrected fluid volume is provided to display 135 in step 270. If the pulse-GPM and dif-GPM are within the desired range of accuracy, then the fluid volume detected is correct and is displayed on display 135.

Figure 5:
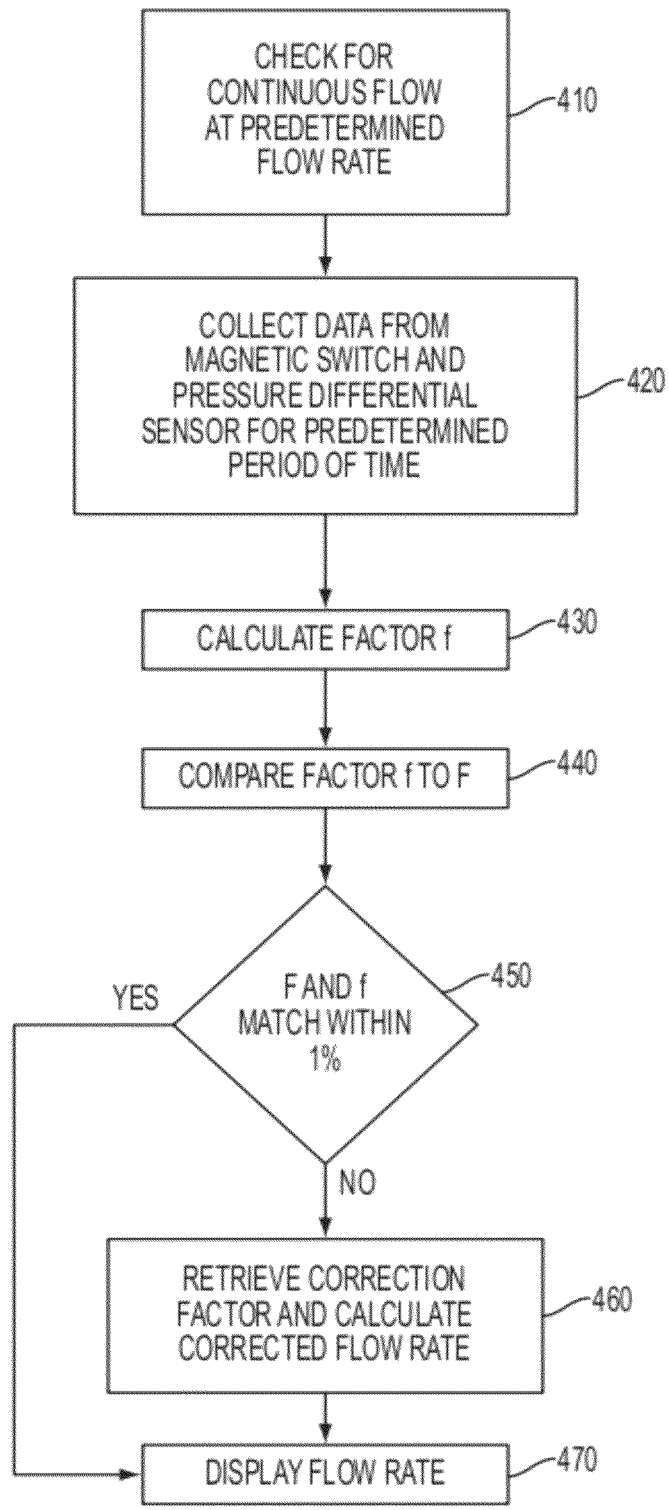
FIG. 5 is a flow chart illustrating a self calibration procedure for a meter.

FIG. 5 is a flow chart illustrating an embodiment of a self calibration procedure for meter 35. In step 410, meter 35 monitors for continuous flow at a predetermined flowrate. When the predetermined flowrate has been achieved, meter 35 begins to collect data from magnetic switch 180 and pressure sensor 190 for a predetermined period of time in step 420. In one embodiment, it may be desirable to determine if magnetic switch 180 and pressure sensor 190 are detecting a constant flow rate. For example, the time between pulses from magnetic switch 180 and the voltage output from pressure sensor 190 may be monitored to ensure that the values do not vary beyond a desired percentage. Once the data is collected, a factor f is calculated by dividing the average pulse data from magnetic switch 180 by the average voltage data from pressure sensor 190 in step 430. Factor f is compared to a factor F, representing an initial value when meter 35 was first manufactured, in step 440. In step 450, a check is performed to determine if the values of f and F match within an acceptable margin, such as +/−1% for example. If the values of f and F do not match within an acceptable margin, then a correction factor is retrieved and a corrected flowrate is calculated in step 460. Once the corrected flowrate is determined, it is displayed in step 470. If the values of f and F do match within an acceptable margin, the calculated flowrate does not need to be corrected and it is displayed in step 470.

Figure 6:
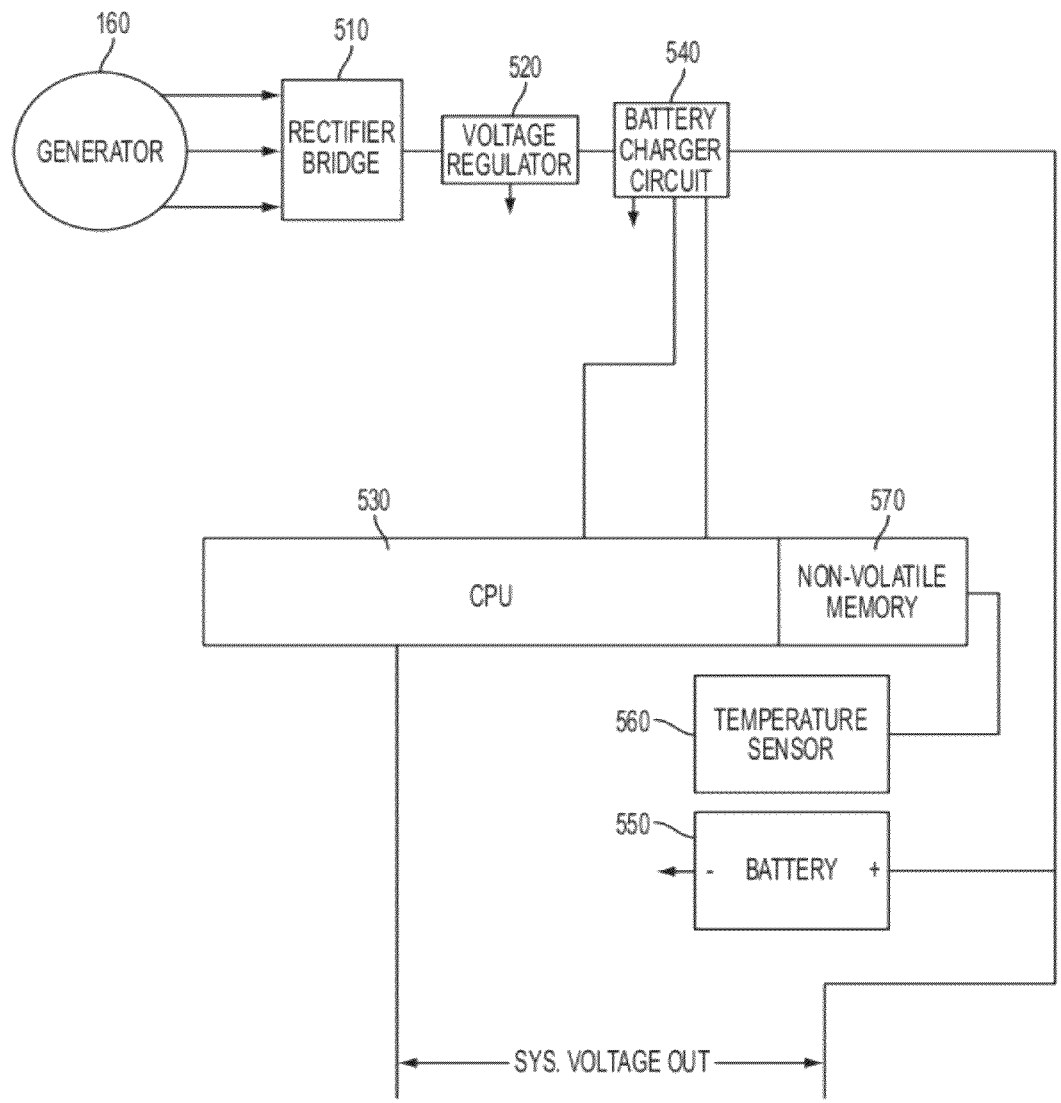
FIG. 6 is an illustration of a charging system.
Figure 7A:
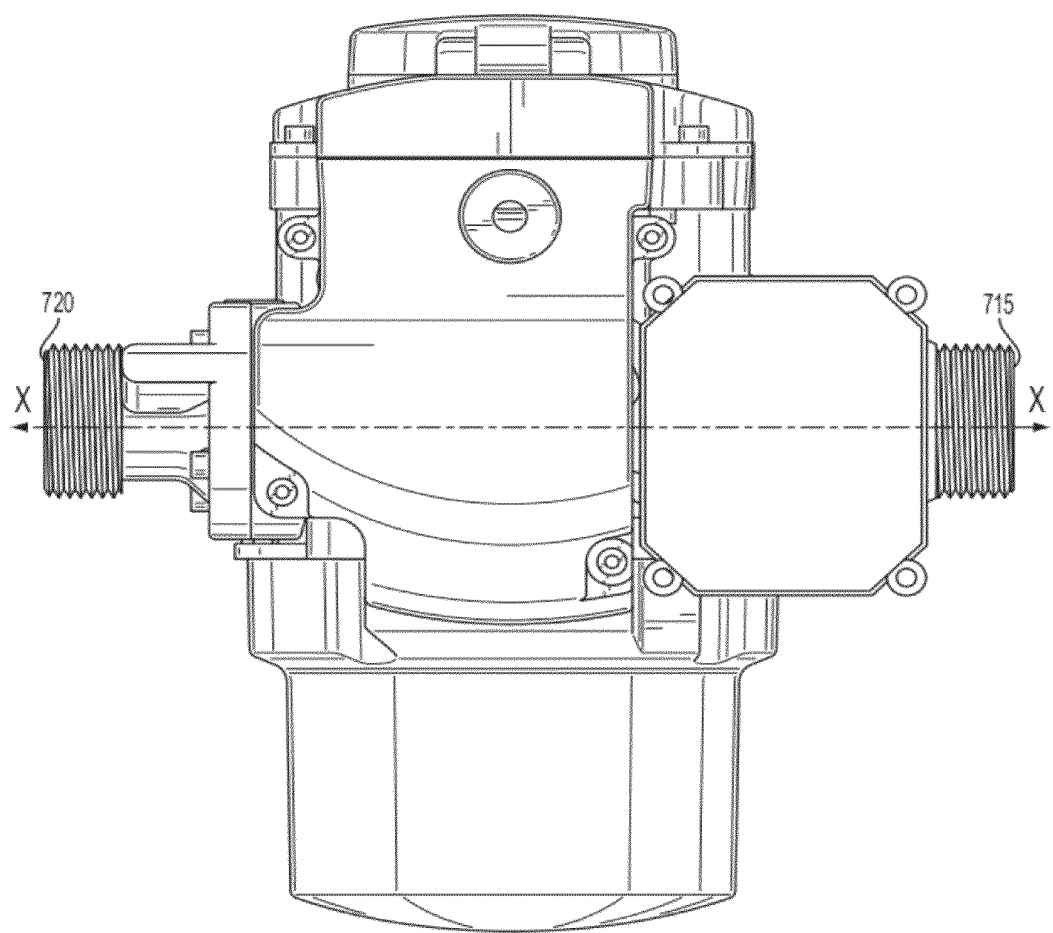
FIGS. 7A-7H are various views of a water meter.
Figure 7B:
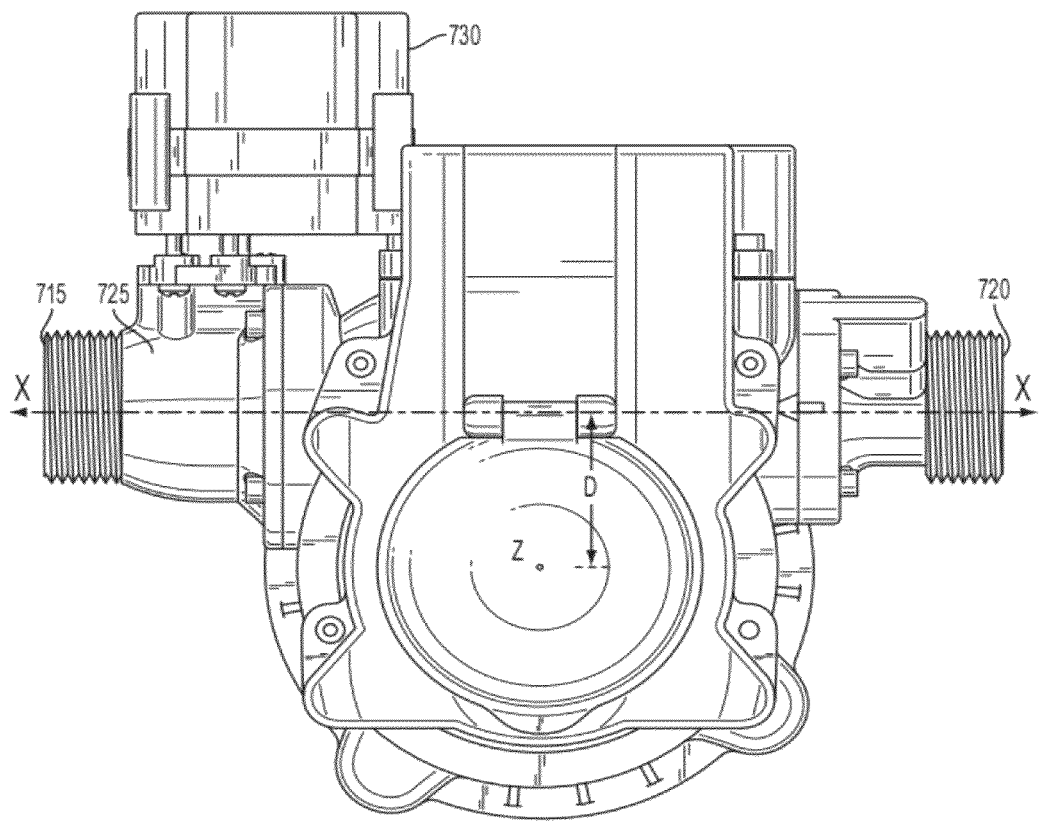
Figure 7C:
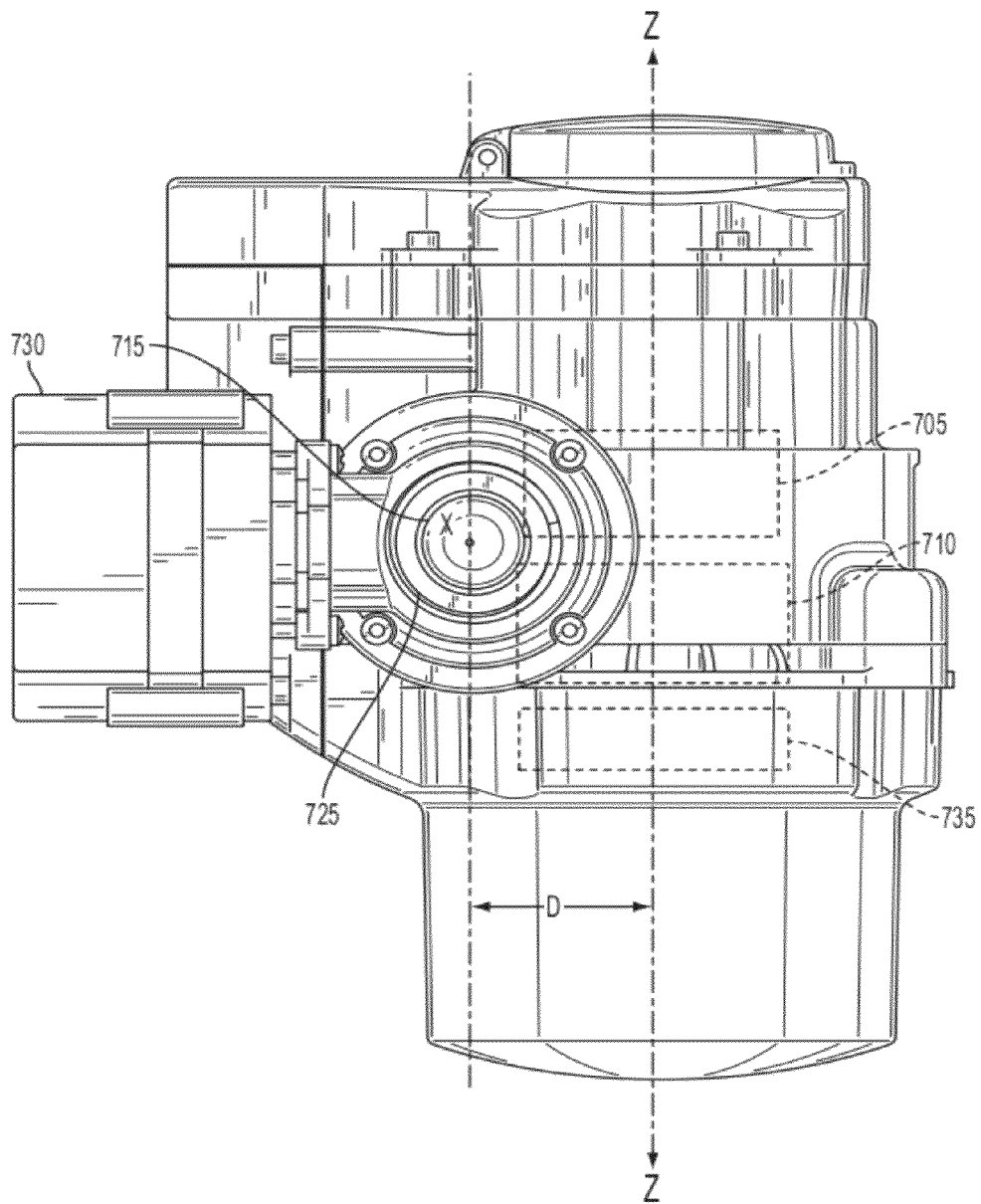
Figure 7D:
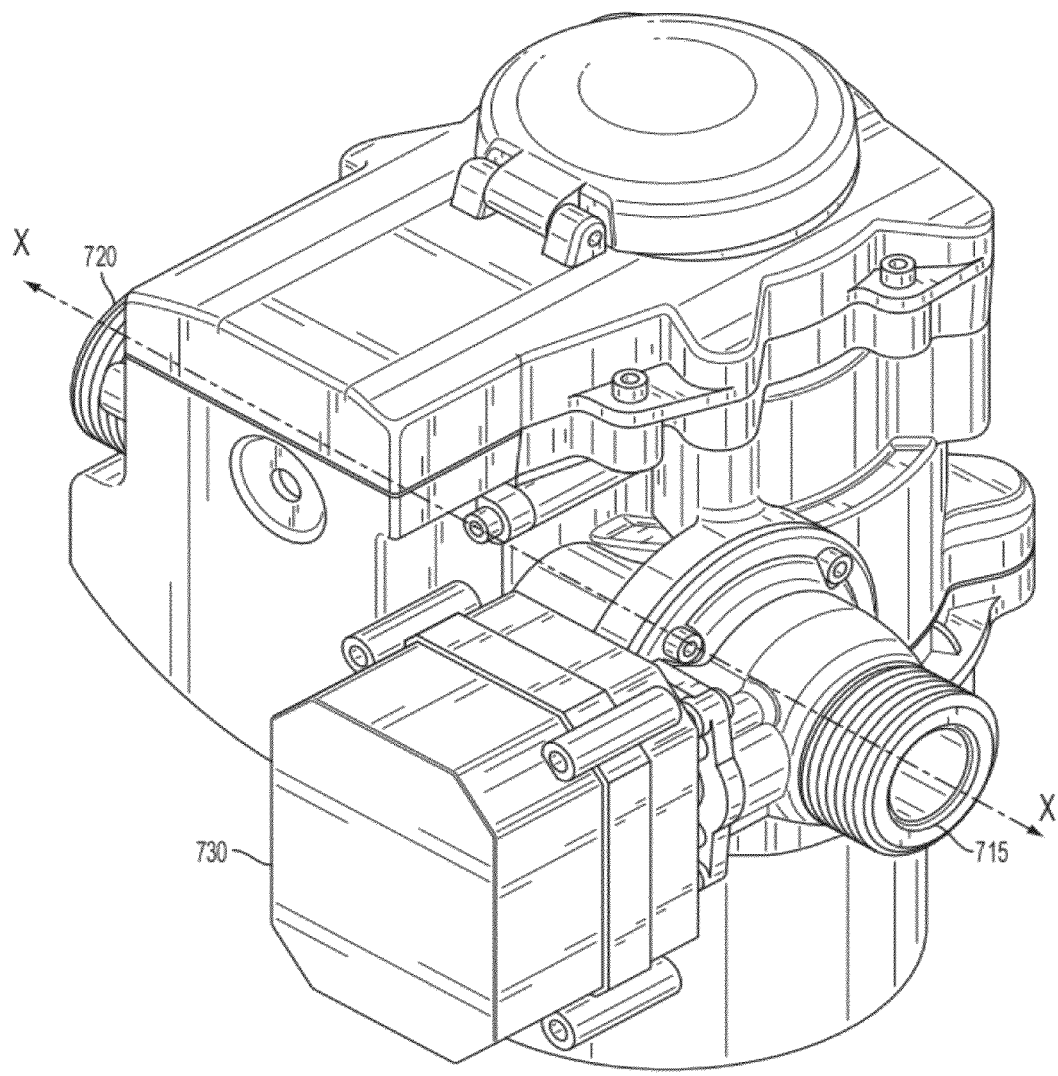
Figure 7E:
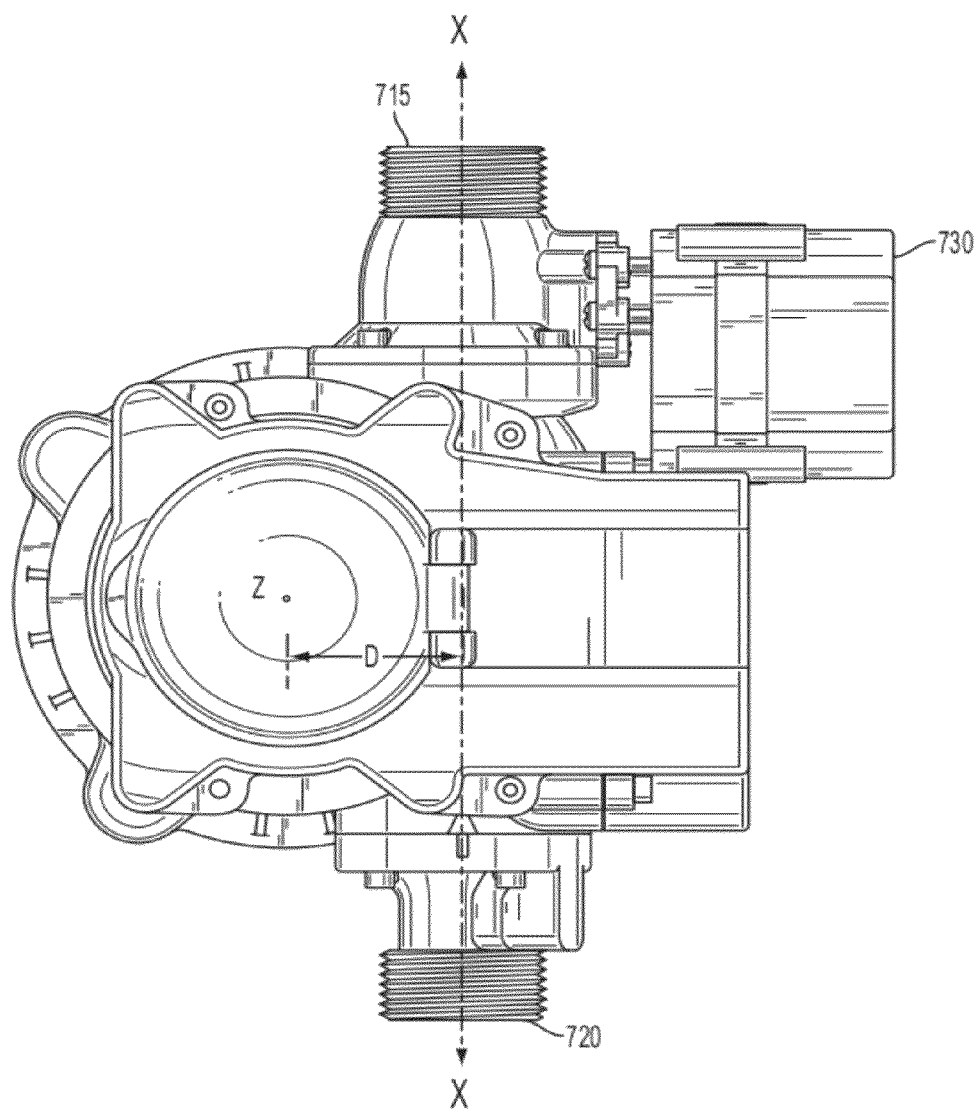
Figure 7F:
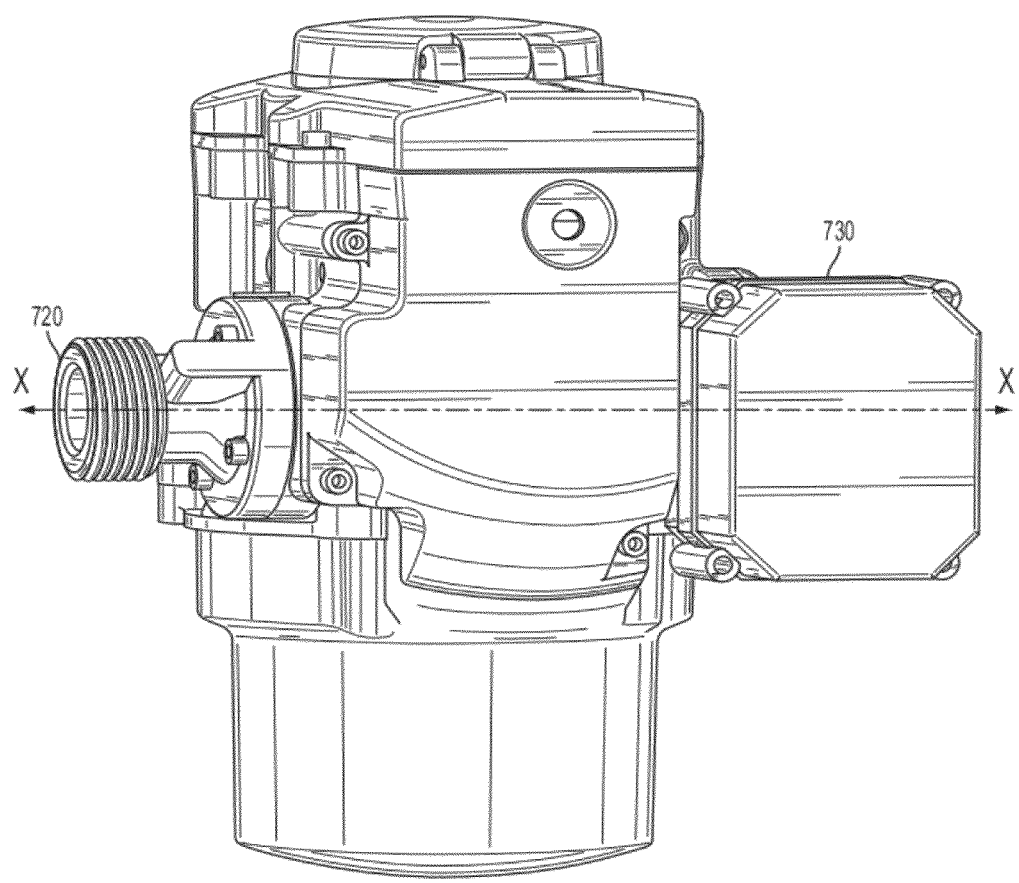
Figure 7G:
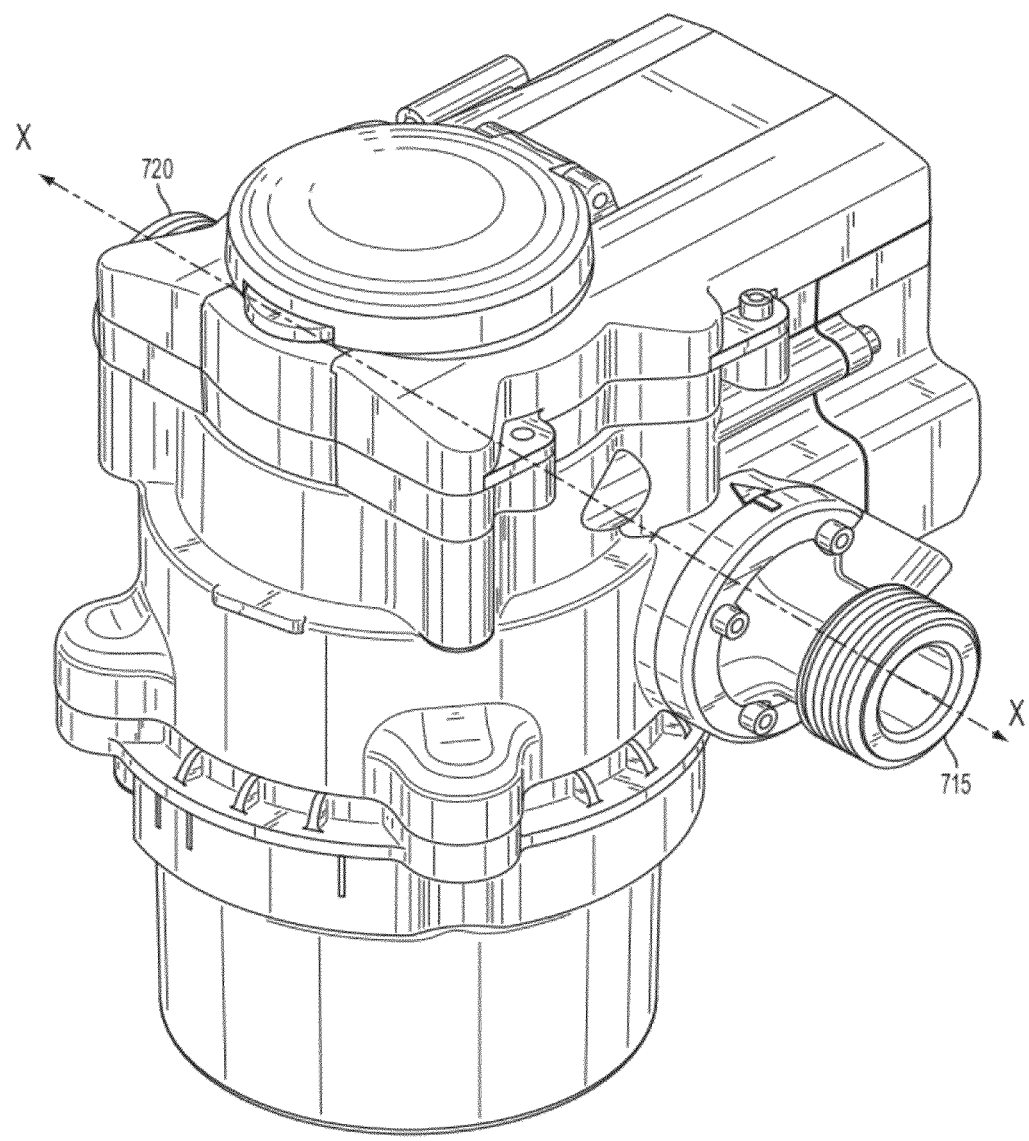
Figure 7H:
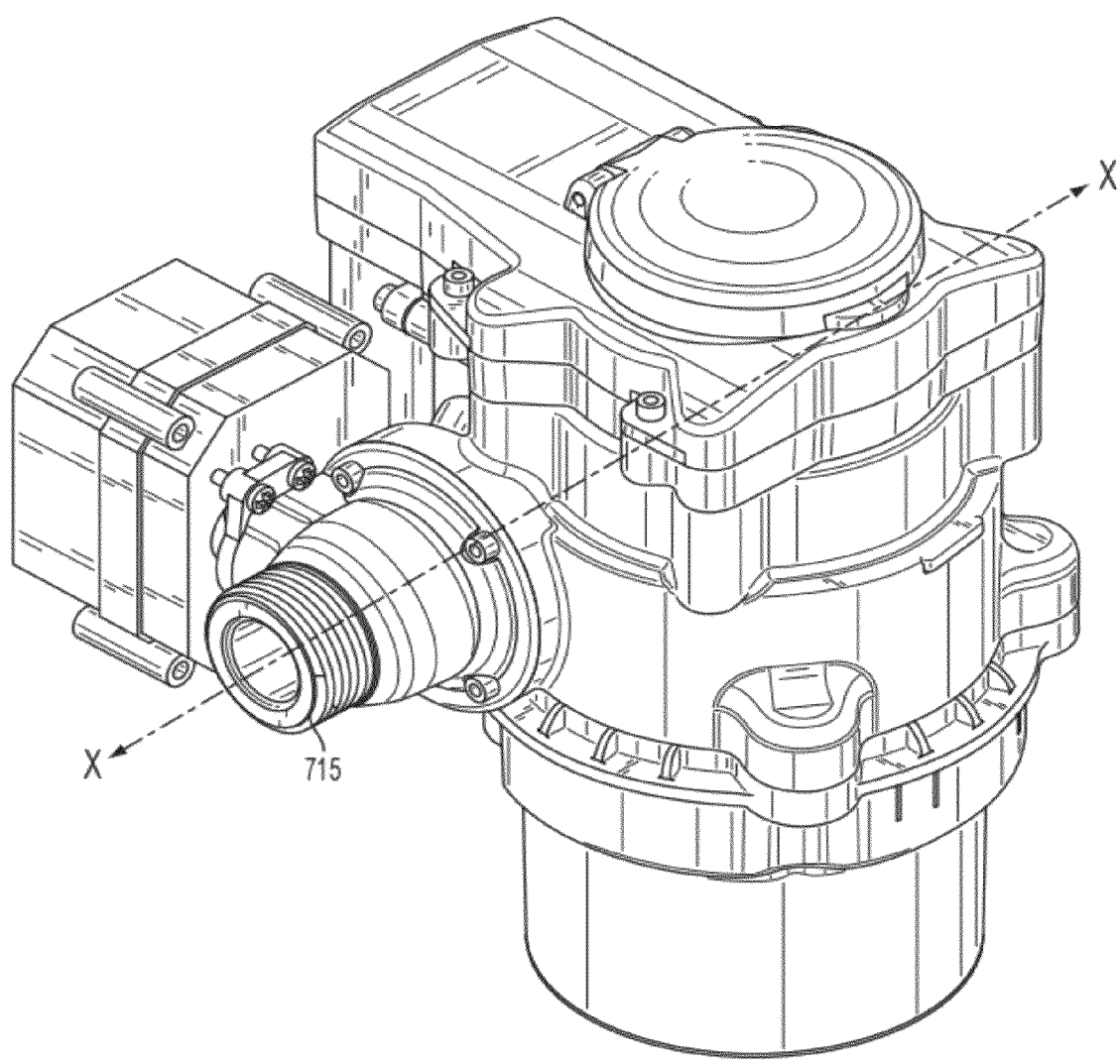

FIG. 6 is an illustration of a charging system. Generator 160 is coupled to rectifier bridge 510, which converts the AC input into DC output. Rectifier bridge 510 is coupled to voltage regulator 520. As fluid flow through generator 160 may be constantly changing, the voltage and current produced by generator 160 may be constantly fluctuating as well. Voltage regulator 520 is utilized to provide a constant voltage to battery charger circuit 540. In one embodiment, voltage regulator 520 is a switching regulator, which provides appropriate charging voltage in situations where the voltage is changing. However, in other embodiments, voltage regulator 520 may be a linear regulator or any suitable type of voltage regulator. Processor 530 is coupled to battery charger circuit 540, battery 550, and battery temperature sensor 560. Battery charger circuit 540 is coupled to battery 550, such as a lithium ion battery, lithium ion capacitor, or any suitable rechargeable battery. Battery temperature sensor 560 is placed adjacent to battery 550 and coupled to processor 530 to monitor the temperature of the battery during charging. Processor 530 controls battery charger circuit 540 to charge battery 550 utilizing a suitable battery charge profile. A battery charge profile may refer to specifications of a charging cycle, which may or may not adjust the voltage and/or current during charging. For example, a battery charging profile may initially charge at a higher current, but reduce the current towards the end of a battery charging cycle to preserve long term battery life. In some embodiments, a battery charge profile may be adjusted based on the temperature of battery 550 detected by temperature sensor 560.

In addition to battery charging, processor 530 is also utilized to perform self-calibration of meter 35. Processor 530 may be coupled to one or more non-volatile memory 570. Non-volatile memory may be utilized to store firmware, programs, data, pulse tables, pressure differential tables, correction factor tables, and the like. For example, non-volatile memory 570 may store programming and data tables utilized to provide self-calibration features of meter 35 discussed herein.

The two-way communication capabilities of meter 35 may allow data stored in non-volatile memory 570 to be updated when desired. For example, data tables utilized for calibration of meter 35 may be updated, such as correction factor tables, pressure differential tables, pulse tables, and the like. Further, the two-way communication capabilities of meter 35 may allow data collected by individual meters 35 to be transmitted to a network operations center.

American Water Works Association (AWWA) Standard(s) suggest, in addition to other requirements, that (1) the distance between the inlet and the outlet of a water meter to be 7½ inches and (2) the inlet and outlet should be axially aligned to the service pipes (e.g. C700 series meters). Because of the linear space constraints caused by AWWA Standard(s) requirement, it may be difficult to fit a metering chamber and control valve into a 7½ inch long water meter. For example, water meters may utilize a cylindrical space of approximately 3¾ inches, leaving only 3¾ inches to incorporate a control valve. Further, in meters utilizing a Venturi tube, a minimum length of five times the largest diameter of Venturi tube may be desirable in front of a pressure measurement point to avoid turbulent flow near a pressure differential sensor. While embodiments discussed herein are directed to AWWA Standard(s), other embodiments may be directed towards meeting International Organization of Legal Metrology (OIML) Standard(s) or water meter standards.

FIGS. 7A-7H are illustrations of water meter 700 with offset chambers. While the embodiments shown include multiple chambers utilized to facilitate metering and power generation, variations of teaching discussed regarding these embodiments are applicable to any suitable water meter with one or more chambers. For example, an embodiment of water meter 35, discussed above in connection with FIGS. 2-6, may incorporate offset chambers as described herein.

A flow axis X passes through the inlet 715 and outlet 720 of water meter 700. A chamber axis Z is an axis passing through the center of a chamber, such as upper chamber 705, lower chamber 710, or the like. In some embodiments, chamber axis Z may be the axis of rotation for turbines or impellers. In order to allow a control valve to be incorporated within water meter 700 while complying with the with the linear space constraints, chamber axis Z of both upper chamber 705 and lower chamber 710 are offset from flow axis X of the axially aligned inlet 715 and outlet 720 by a distance D.

Inlet 715 and outlet 720 are axially aligned on the axis labeled X (i.e. flow axis). The chamber axis, illustrated as axis Z, passes through the center of upper chamber 705 and lower chamber 710. Further, chamber axis Z is offset from flow axis X by a distance D. While the centers of upper chamber 705 and lower chamber 710 are both aligned along chamber axis Z, in other embodiments, the centers of upper chamber 705 and lower chamber 710 may not be aligned along the same axis. As such, the chamber axes of upper chamber 705 and lower chamber 710 may be offset from a flow axis X by different distances.

By offsetting one or more chambers 705, 710, a control valve dispose in an area 725 near inlet 715 may be incorporated into water meter 700 while allowing meter 700 to comply with AWWA Standard(s). Control valve 725 may be a ball valve or any other suitable type of valve. Control valve 725 may be actuated by gearbox 730. Gearbox 730 may provide a motor and gearing necessary to actuate valve 725. Control valve 725 may be utilized to turn off and on water for a client. In addition, control valve 725 may also provide partially opened setting. For example, water meter 700 may allow control valve 725 to be partially opened to limit the flow of water during certain times, such as water conservation periods.

In one embodiment, a pancake motor may be incorporated into the housing of water meter 700. For example, the armature of motor 735 may be encapsulated within an existing plastic part of meter 700, such as a part defining upper chamber 705, a part defining lower chamber 710, or any other suitable plastic part of meter 700. Magnetic fields are created between magnets located on a rotating part, such as an impeller or turbine, already present inside of the meter and the encapsulated armature allowing the elimination of most of the parts included in a traditional motor, such as a housing, shaft, and the like. Pancake motor 735 also eliminates the need for magnetic coupling and a generator, which increases efficiency and power generation capabilities.

For example, pancake motor 735 may substitute a magnetic coupler and generator in a meter with power generation capabilities. Magnets placed on a turbine/impeller in lower chamber 710 create a magnetic field with an armature of motor 735. Electrical energy harnessed by pancake motor may be provided to a charging system (e.g. FIG. 6), wireless communication modules 193a-b, gearbox 730, and the like.

From the foregoing detailed description of specific embodiments of the invention, it should be apparent that a fluid meter that is novel has been disclosed. Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. A meter comprising:
   an inlet for receiving a fluid;
   a housing defining a first cylindrical chamber receiving the fluid from the inlet, wherein a chamber axis passes through a center of the first cylindrical chamber, and said first cylindrical chamber utilized a first turbine for metering fluid flow;
   a second cylindrical chamber defined by said housing for generating electric power, wherein said chamber axis passes through a center of the second cylindrical chamber;
   a second turbine housed within said second cylindrical chamber, wherein fluid flow through said second cylindrical chamber causes the second turbine to rotate;
   a generator coupled to said second turbine, wherein rotation of said second turbine causes the generator to rotate, and said generator utilizes rotational energy to generate electrical energy;
   a control valve coupled to the housing, wherein the control valve is aligned along a flow axis;
   a valve motor coupled to the control valve, wherein the valve motor actuates the control valve; and
   an outlet coupled to the housing, wherein the outlet is axially aligned with the inlet along the flow axis, and the flow axis does not intersect the chamber axis, and a distance between said inlet and said outlet is 7½ inches.

2. The meter of claim 1 further comprising a gearbox coupled to the control valve and the valve motor.

3. The meter of claim 1, wherein the control valve comprises a ball valve.

4. The meter of claim 1, wherein settings for the control valve are open, closed, and partially open.

5. The meter of claim 1, wherein said generator is a pancake motor, and the pancake motor is utilized to generate power.

6. A meter comprising:
an inlet;
a housing defining a first chamber, wherein the housing is coupled to the inlet;
an impeller housed within the first chamber, wherein the impeller rotates around a chamber axis passing through a center of the first chamber, and said first chamber utilizes said impeller for metering fluid flow;
a second chamber defined by said housing for generating electric power, wherein said chamber axis passes through a center of the second chamber;
a second turbine housed within said second chamber, wherein fluid flow through said second chamber causes the second turbine to rotate;
a control valve coupled to the housing, wherein the control valve controls entry of the fluid provided to the meter, and the control valve is aligned along a flow axis; and
an outlet coupled to the housing, wherein the flow axis passes through the inlet and the outlet, and the chamber axis is offset by a selected distance from the flow axis.

7. The meter of claim 6 further comprising:
a valve motor coupled to the control valve, wherein the valve motor actuates the control valve.

8. The meter of claim 7, wherein the control valve comprises a ball valve.

9. The meter of claim 7, wherein settings for the control valve are open, closed, and partially open.

10. The meter of claim 7 further comprising a gearbox coupled to the control valve and the valve motor.

11. The meter of claim 6, further comprising:
a generator coupled to said second turbine, wherein rotation of said second turbine causes the generator to rotate, and said generator utilizes rotational energy to generate electrical energy.

12. A fluid metering system comprising:
an inlet;
a first housing defining a first chamber for power generation, wherein the first housing is coupled to the inlet;
an first turbine housed within the first chamber, wherein the first turbine rotates around a first chamber axis as fluid flows through the first chamber;
a second housing defining a second chamber for metering fluid flow, wherein the second housing is coupled to the first housing;
a second turbine housed within the second chamber, wherein the second turbine rotates around a second chamber axis as fluid flows through the second chamber;
a control valve controlling entry of the fluid provided to the meter, wherein the control valve is aligned along the flow axis; and
an outlet axially aligned with the inlet along a flow axis, wherein the first chamber axis is offset by a first selected distance from the flow axis and the second chamber axis is offset by a second selected distance from the flow axis.

13. The system of claim 12 further comprising:
a flow restrictor positioned within the system; and
a pressure differential sensor coupled to the flow restrictor, wherein the pressure differential sensor is utilized to calculate fluid flow.

14. The system of claim 12 further comprising:
a control valve controlling entry of the fluid provided to the meter, wherein the control valve is aligned along the flow axis; and
a motor coupled to the control valve, wherein the motor actuates the control valve.

15. The system of claim 14 further comprising a gearbox coupled to the control valve and the valve motor.

16. The system of claim 14, wherein the control valve comprises a ball valve.

17. The system of claim 14, further comprising a generator coupled to said second turbine, wherein rotation of said second turbine causes the generator to rotate, and said generator utilizes rotational energy to generate electrical energy.

18. The system of claim 14, wherein settings for the control valve are open, closed, and partially open.

* * * * *